(12) United States Patent
Becker et al.

(10) Patent No.: US 9,218,345 B1
(45) Date of Patent: Dec. 22, 2015

(54) SYSTEM AND METHOD FOR BACKING UP A COMPUTER SYSTEM

(75) Inventors: Gregory A. Becker, Austin, TX (US); Robert Condon, Nashua, NH (US); David A. Knight, Dallas, TX (US); David E. Medders, Dallas, TX (US); Michael Rowan, Amesbury, MA (US)

(73) Assignee: Symantec Corporation, Mountain View, CA (US)

( * ) Notice: Subject to any disclaimer, the term of this patent is extended or adjusted under 35 U.S.C. 154(b) by 647 days.

(21) Appl. No.: 12/544,034

(22) Filed: Aug. 19, 2009

Related U.S. Application Data

(62) Division of application No. 11/455,124, filed on Jun. 15, 2006, now Pat. No. 7,617,414, which is a division of application No. 10/614,347, filed on Jul. 8, 2003, now Pat. No. 7,844,577.

(60) Provisional application No. 60/395,611, filed on Jul. 15, 2002.

(51) Int. Cl.
 *G06F 17/30* (2006.01)
 *G06F 11/14* (2006.01)

(52) U.S. Cl.
 CPC ...... *G06F 17/30067* (2013.01); *G06F 11/1471* (2013.01)

(58) Field of Classification Search
 USPC .................................................. 707/600–704
 See application file for complete search history.

(56) References Cited

U.S. PATENT DOCUMENTS

| | | | |
|---|---|---|---|
| 5,369,757 A | 11/1994 | Spiro et al. | |
| 5,381,545 A | 1/1995 | Baker et al. | |
| 5,596,710 A | 1/1997 | Voigt | |
| 5,615,364 A | 3/1997 | Marks | |
| 5,765,193 A | 6/1998 | Rosich et al. | |
| 5,819,292 A | 10/1998 | Hitz et al. | |
| 5,857,207 A | 1/1999 | Lo et al. | |
| 5,991,772 A | 11/1999 | Doherty et al. | |
| 6,016,553 A | 1/2000 | Schneider et al. | |
| 6,101,585 A | 8/2000 | Brown et al. | |
| 6,324,654 B1 | 11/2001 | Wahl et al. | |
| 6,453,325 B1 * | 9/2002 | Cabrera et al. | 1/1 |
| 6,529,995 B1 * | 3/2003 | Shepherd | 711/114 |
| 6,553,392 B1 | 4/2003 | Mosher et al. | |
| 6,665,815 B1 | 12/2003 | Goldstein et al. | |

(Continued)

FOREIGN PATENT DOCUMENTS

WO WO 01/95315 12/2001

*Primary Examiner* — Hosain Alam
*Assistant Examiner* — Tuan-Khanh Phan
(74) *Attorney, Agent, or Firm* — Wilmer Cutler Pickering Hale and Dorr LLP

(57) ABSTRACT

A backup computer storage system that protects and/or recovers data on a primary computer storage system is disclosed. The backup computer system may be used to backup databases, files, and/or applications. In some embodiments, the backup system may be used to backup an image of the primary computer storage system. In other embodiments, the backup system may be used to backup one or more databases, replicate an image of data that is on the primary computer storage system, restore data from the backup system to the primary computer storage system, restore data to a database while non-affected portions of the database are available and can be used, record all transactions in real time without overwriting any previously stored backup data, and maintain historical and/or chronological information related to backed up data.

18 Claims, 5 Drawing Sheets

(56) References Cited

U.S. PATENT DOCUMENTS

| | | |
|---|---|---|
| 6,732,244 B2 | 5/2004 | Ashton et al. |
| 6,769,074 B2 | 7/2004 | Vaitzblit |
| 6,848,037 B2 | 1/2005 | Flaherty et al. |
| 6,915,315 B2 | 7/2005 | Autrey et al. |
| 6,934,877 B2 | 8/2005 | Tamatsu |
| 7,036,043 B2 | 4/2006 | Martin et al. |
| 7,082,548 B2 | 7/2006 | Nakano |
| 2002/0178173 A1 | 11/2002 | Chefalas et al. |
| 2003/0074378 A1 | 4/2003 | Midgley et al. |
| 2003/0081468 A1 | 5/2003 | Kubiak |
| 2003/0115221 A1 * | 6/2003 | Goode et al. .......... 707/200 |
| 2003/0172158 A1 | 9/2003 | Pillai et al. |
| 2004/0034752 A1 | 2/2004 | Ohran |
| 2004/0143713 A1 | 7/2004 | Niles et al. |
| 2004/0163009 A1 | 8/2004 | Goldstein et al. |
| 2004/0243775 A1 | 12/2004 | Coulter et al. |
| 2004/0268068 A1 | 12/2004 | Curran et al. |
| 2005/0114285 A1 | 5/2005 | Cincotta |

* cited by examiner

SYSTEM AND METHOD FOR BACKING UP A COMPUTER SYSTEM

CROSS-REFERENCE TO RELATED APPLICATIONS

This patent application is a divisional of U.S. patent application Ser. No. 11/455,124, filed Jun. 15, 2006, which is a divisional of U.S. patent application Ser. No. 10/614,347, filed Jul. 8, 2003, which claims priority to U.S. Provisional Patent Application No. 60/395,611, filed Jul. 15, 2002, each of which is hereby incorporated by reference herein in its entirety.

FIELD OF THE DISCLOSURE

This present disclosure relates generally to a system and method for backing up a computer system and, more particularly, to a backup system for the recovery and/or restoration of data for a computer system.

BACKGROUND OF THE DISCLOSURE

The use of and dependency on data in today's society is rapidly expanding. Now more than ever, businesses continuously rely on data in order to operate. Businesses and their customers demand that the data be available and accurate.

Various conventional mechanisms for protecting and recovering data are available for businesses. These so-called backup systems vary in the levels of protection they provide, the amount of time required to recover the backed up data and the difficulty associated with their integration with the businesses' other systems and applications. Generally, the success of these conventional mechanisms is measured in terms of "data availability" i.e., how quickly a system, a database, or a file can be restored after a failure or corruption of data.

Typically, most businesses use some sort of a backup procedure to backup data onto a backup system. There are multiple scenarios in which backup systems can be used. A backup system can be used when a disk is corrupted or otherwise lost. In this scenario, the particular database or application using the disk is quiesced and the information is backed up. Another reason is if a logical corruption occurs and data is lost. In this scenario, the backup system can use logs to determine the proper point in time to which the database or application should be restored.

There are numerous types of backup procedures and systems available. One type of backup can be referred to as a "cold" backup. In a cold backup, the file, database, or application that is being backed up has to be quiesced and cannot be used during the backup process. Moreover, users may be unable to access the files during a full system backup. Accordingly, the cost of performing such backups is greater in terms of user productivity and/or system resources.

Another type of backup can be referred to as a "hot" backup. In a hot backup, the file, database, or application that is being backed up is briefly stopped and placed in a different mode during the backup process.

A snapshot can reduce the amount of time a database or application is stopped. A backup system can use a snapshot in either a cold backup process or a hot backup process. In a cold backup process, the relevant database or application is shut down during the snapshot creation process. Once the snapshot creation is completed, the database is restarted while a backup of the relevant information on the snapshot is performed. In a hot backup process, the relevant database or application needs to enter hot backup mode before the snapshot is taken.

Once the snapshot creation is completed, the database can be brought out of hot backup mode. There is overhead associated with snapshot maintenance that adversely impacts input/output (I/O) throughputs.

Typically, a backup procedure performs a full system backup every time the files are backed up. A full system backup ensures that every file on the system is copied to secondary or redundant storage. A backup process can be established to backup data on a regular or periodic basis (e.g., daily, nightly, weekly, etc.).

However, as present business applications run virtually around the clock with little tolerance for any down time, the time frame or window for backing up data is small if it exists. Snapshot technology minimizes downtime, at the expense of throughput, but can not reduce the backup period. Furthermore, these periodic backups can become obsolete almost immediately after they are completed. Regardless of the frequency of the incremental backups which all require a form of database interruption, there is a constant risk of losing data between them. The risk of losing data can be reduced by performing backups more frequently.

Backed up data can be stored on a storage tape. While storage tapes allow for scheduled backups, recovering of data from them is time consuming. As a result, the availability and performance of the production and application servers are negatively impacted.

In conventional backup processes, a replication technique can be used to replicate the data in a file or database. One type of replication is a synchronous volume replication. In this type, the information is replicated at the same time that the information is being stored. This process requires substantial resources and slows down the overall processing of the computer system. Also, the storage volumes must be consistent with each other. However, replication only protects against the physical loss of data. If data is logically corrupted, both the primary and replicated images are corrupted, and recovery is not possible.

Another type of replication is an asynchronous volume replication. In an asynchronous volume replication process, information is backup up asynchronously with respect to the rate at which it is stored. For example, replication can be delayed with the delay being a set period of time. The period for delay is a window during which a system administrator hopes to stop the replication if an error is identified in order to prevent the replication of corrupted data or information.

One flaw associated with conventional replication methods is that any corruption to the data can be duplicated easily into the image. Conventional replication systems lack historical or chronological information relating to data or data changes. The lack of such information prevents the replication system from providing corruption protection and drives the recovery time up.

Some conventional backup systems capture data that can be used in a subsequent backup process. Data can be captured at a variety of locations in a computer system. Some conventional backup systems generally capture data at the file layer of a computer system. Capturing data at the file layer makes it difficult to support open files or active databases.

Other conventional backup systems capture data at the physical storage layer of a computer system. By capturing data at the physical storage layer, a computer system is unable to maintain consistency across unlinked devices such as database tables on different storage volumes.

Once data is captured, the backup system can use the data in a variety of processes. One such process is the restoration of data on a computer system in the event of a failure or corruption of a computer system. The restoration of data using backed up data is limited by the particular backup system and procedure that were used to collect the data.

Some recovery methods require the application of a database transaction or archive log of data. Some conventional databases maintain a temporary log of data transactions since the last save of data. When the user saves data to the database, the temporary log is wiped out. Because the temporary logs are not maintained, restoration of data requires the user go back in time completely thereby losing some data.

Conventional archive logs only contain forward information, thereby limiting the use and effectiveness of the archive logs in restoring information. By definition, restoration is to a point in the past. The fact that archive logs can only move information forward through time implies that they must be used in conjunction with some other forms of data restoration, such as restoring a cold full backup, in order to achieve a restoration to a point in the past.

In some conventional backups in which data capture is done at the physical layer, but the associated application spans multiple physical storage devices, referential integrity of the data over the independent storage devices can only be achieved if the application is quiesced. In other words, consistency between data spread across multiple physical devices is a property which cannot be maintained by the physical backup system on its own. Coordination between the physical layer and the application layer is required. In effect, the physical layer needs to understand the state of the application that is using it for I/O. To this extent, some conventional physical layer backups require that applications lock users out for a particular amount of time in order to quiesce the data long enough to guarantee consistency across multiple physical devices. This lock-out procedure results in a down time in productivity.

A need exists for an efficient and a cost effective approach to backing up and restoring data after a failure or corruption of data. A need also exists for a backup system and technique that does not negatively impact applications during the backup process. A need also exists for a backup system and technique that reduces the data recovery time and provides for information recovery without requiring a full recovery to a baseline.

SUMMARY OF THE DISCLOSURE

The present disclosure relates to a backup computer storage system that protects and/or recovers data on a primary computer system. The backup computer system may be used to backup databases, files, and/or applications. In some embodiments, the backup system may be used to backup an image of the primary computer system. In other embodiments, the backup system may be used to backup one or more databases or applications.

In still other embodiments, the backup system may replicate an image of data that is on the primary computer system. The backup system may also be used to restore data from the backup system to the primary computer system.

In yet other embodiments, the backup system may restore data to a database while non-affected portions of the database are available and can be used.

In additional embodiments, the backup system may record all transactions in real time without overwriting any previously stored backup data.

In further embodiments, the backup system may maintain historical and/or chronological information related to backed up data.

The primary computer storage system may include an intercept agent that captures data writes in transit to any location on the primary computer system. In some embodiments, the agent may capture data writes at a logical volume layer of the primary computer system. In other embodiments, the agent may be used with any type of storage arrangement on the primary computer system.

BRIEF DESCRIPTION OF THE DRAWINGS

In order to facilitate a fuller understanding of the present disclosure, reference is now made to the accompanying drawings, in which like elements are referenced with like numerals. These drawings should not be construed as limiting the present disclosure, but are intended to be exemplary only.

DETAILED DESCRIPTION OF EXEMPLARY EMBODIMENTS

Figure 1:
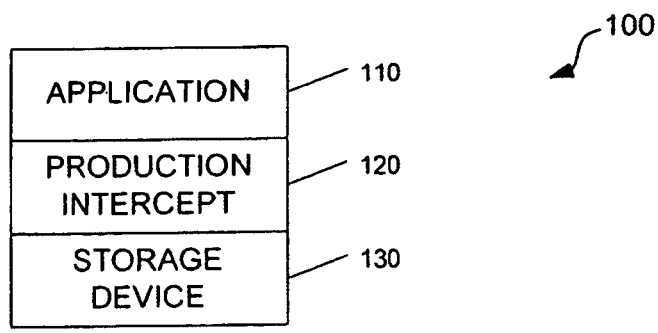
FIG. 1 illustrates an architecture of a backup system according to one embodiment of the present disclosure.

In one embodiment, a computer system includes a primary computer system and a backup storage system. The term "primary" system is used generically to represent any computer system, as a data storage system, that includes an application and a storage device or system. The term "backup storage system" is used generically to represent any computer system that can be used to store backed up data from the primary system.

In one embodiment, the primary system includes an application that writes data to a set of storage devices. The term "production image" is used to represent the data in that application's set of storage devices. The primary system also includes an intercept agent that captures the application's data writes to its production image. The term "captured" is used generically to represent any method of gathering data for later use. There are several methods that can be used. In one embodiment, the intercept agent intercepts the data writes in transit from the application to its set of storage device, duplicates those writes, then simultaneously passes those data writes to both the production image resident in the application's set of storage devices, and to a separate sequential "logging" storage device. In one embodiment, all of the application's writes are stored in the logging storage device in the sequence in which they were issued by the application, including both the data and additional metadata regarding the time, location and size of those writes.

Once the data writes are captured by the intercept agent, the data writes are processed for later use. In one embodiment, the data writes are stored in a logical disk volume referred to as an "After Image Log File Container" (AILFC). The data writes are subsequently transferred from the intercept agent to a backup storage system. In one embodiment, the backup storage system includes a replicated image of the production image of the data on the primary system. The replicated image is updated to be current with the production image by using the data writes stored in an AILFC.

In one embodiment, the backup storage system records or processes the data writes in an AILFC received from the intercept agent by first creating a "Before Image Log File Container" (BILFC) and then applying the data writes in the AILFC to the replicated image. The AILFC contains a chronologically ordered sequence of write meta and data from a first point in time to a second point in time. These points in time are relative to the state of the production image data.

Based on the meta information of the data writes in the AILFC, and the data in the replicated image at the first point in time, the net change in the data of the production image from the second point in time to the first point in time can be determined and stored in a BILFC. The change from the second point in time to the first point in time can be referred to as a backward increment. Based on the data writes between the first lime and the second time, a net change in the data of the production image at the first time and the data of the production image at the second time can be determined. The change from the first time to the second time can be referred to as a forward increment. Once the data writes in the AILFC are applied to the replicated image, moving it from the first time to the second time (the state of the data in the production image at the second time), the forward increment and reverse increment can be archived for later use. The reverse increment can include individual data writes that can be applied to the application's image—i.e., the production image, replicated image, or read/write snapshot of the replicated or production images, as one transaction to restore the image from the second time back to the first time. The forward increment can then be applied in part, or in its entirety as one transaction to roll the image forward from the first time to any point in time up to and including the second time.

In one exemplary data restoration process, a system administrator or user can identify a time to which the production image should be restored. Once the backup system receives the target restore or estimated time, a restore agent of the backup manager can identify the relevant chain of backward increments and potentially one forward increment to bring the production and replicated images back to that target time. This implies that the production application is in an inactive mode while its image is being restored on disk. If the production application has not crashed, and the system administrator wishes to keep it active during the restoration process, a restore to a read/write snapshot or "clone" of the production or replicated image is used. The system administrator can identify a time to which the clone of the replicated or production image should be restored. While the clone is being restored to a point in the past, the application can simultaneously be active and updating the production image, which in turn is moving the production and replicated images forward through time. The system administrator can then mount a second instance of the application over the restored cloned image, and feedback objects from the restored application to the live production application. In this way, the system administrator can restore specific database objects to the live production database. To summarize, the entire cloned image of the application is restored, a second instance of the application is mounted over the restored clone, and objects are exported from the clone application, and imported back into the production application.

FIG. 1 illustrates an architecture of a backup system according to one embodiment of the present disclosure. Primary computer system 100 provides primary application and data storage services to a user. As illustrated, the primary computer system 100 includes an application layer 110 and a storage device layer 130. The components of primary computer system 100 may be stored on a single server or located on multiple servers. As would be apparent, primary computer system 100 may include multiple applications at the application layer 110.

Storage device layer 130 is used generically to represent various storage devices and/or systems on which data can be stored. For example, storage device layer 130 may include logical storage volumes, raw disk partitions, and/or physical storage devices, and/or Logical Unit Numbers (LUNS).

During normal operation of primary computer system 100 and application 110, data from application 110 is written to the storage device layer 130. Each data write is written from application 110 to the storage device layer 130.

As illustrated in FIG. 1, the primary computer system 100 includes an intercept agent in the production intercept layer 120. The production intercept layer 120 functions as a layer in the primary computer system 100 and operates in conjunction with the backup system of the present disclosure. According to some embodiments of the present disclosure, the production intercept layer 120 is located on the application server logically upstream of any splitting of data streams to multiple storage devices.

In one embodiment, the production intercept layer 120 intercepts and encapsulates all of the incremental data writes in transit from the application layer 110 to the Storage device layer 130. The production intercept layer 120 intercepts and encapsulates the data writes in a transparent manner so that the applications of the primary computer system 100 are not aware of the intercept process. In one embodiment, the data writes are captured synchronously in transit to the storage device layer 130. The production intercept layer 120 captures the data writes regardless of the particular applications or storage arrangement. The capture and storage of the data writes is discussed in detail below.

Figure 2:
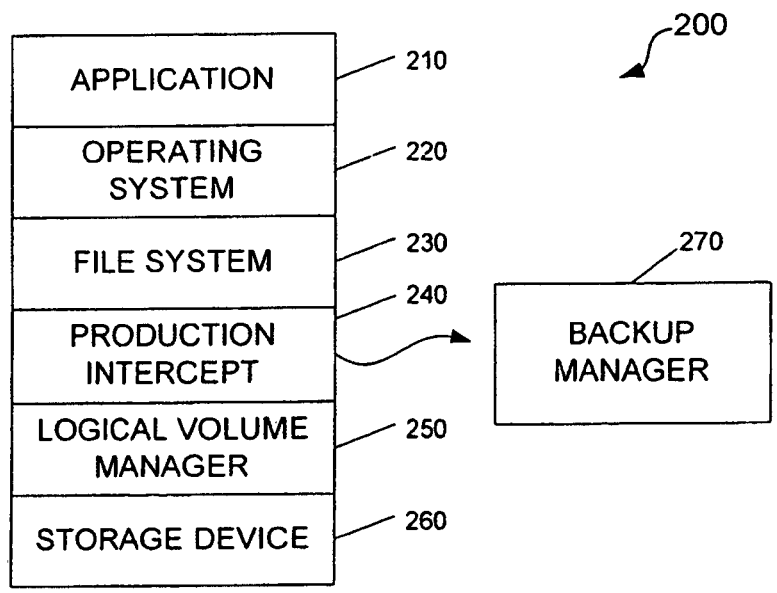
FIG. 2 illustrates an architecture of a backup system according to an alternative embodiment of the present disclosure.

An alternative embodiment of a primary computer system 200 according to the present disclosure is illustrated in FIG. 2. In this embodiment, the primary computer system 200 includes several conventional layers, including an application layer 210, an operating system layer 220, a file system layer 230, a logical volume manager (LVM) layer 250 and a storage device layer 260. As would be appreciated, primary computer system 200 may include any combination of these layers and/or other layers. In some embodiments, the operating system layer 220 can be an AIX operating system developed by IBM or a Solaris operating system developed by the Sun Corporation. In other embodiments, the operating system layer 220 can be any available operating system.

The file system layer 230 logically organizes information stored on the storage devices of storage device layer 260 as a hierarchical structure of files. The file system layer 230 may include several program modules, e.g., software drivers, etc., that incorporate a command set for the storage devices in the storage device layer 260.

The LVM layer 250 is a subsystem for disk storage management. The LVM layer 250 supports enterprise level volume management of disks and disk subsystems by grouping arbitrary disks into volume groups. The total capacity of volume groups can be allocated to logical volumes, which are accessed as regular block devices as would be appreciated.

The LVM layer 250 provides logical separation of storage, the ability to move data from one physical device to another while on-line, and dynamic block device resizing. The LVM layer 250 also enables system administrators to upgrade systems, remove failing disks, reorganize workloads, and adapt to changing system needs, through a minimum amount of time and effort.

In the illustrated embodiment, the data writes pass from the file system layer 230 to the LVM layer 250 in an I/O data stream in the form of block reads and writes. The production intercept layer 240 is the location in the 110 path at which a consistent write order for the purposes of asynchronous replication, such as First In First Out, across all storage devices is assured.

As illustrated in FIG. 2, the primary computer system 200 may also include an intercept agent or production intercept layer 240, which is represented as another layer in the primary computer system 200. In these embodiments of the present disclosure, the production intercept layer 240 is logically located between the file system layer 230 and the LVM layer 250. In this location, the production intercept layer 240 may record or direct data writes as they pass from the file system layer 230 to the LVM layer 250.

In other embodiments of the present disclosure, the production intercept layer 240 is logically located between the operating system layer 220 and the LVM layer 250. In this location, the production intercept layer 240 may record or direct data writes as they pass from the operating system layer 220 to the LVM layer 250. In still other embodiments of the present disclosure, the application layer exists on a remote production host, and the operating system layer spans the remote and local production hosts. The local host's operating system may be presenting physical devices, such as LUNS, to the remote production hosts operating system, for example. Again, the production intercept layer 240 is logically located between the local production host's operating system layer 220 and the LVM layer 250. In this location, the production intercept layer 240 may record or direct data writes as they pass from the operating system layer 220 to the LVM layer 250. As discussed in detail below, the production intercept layer 240 records the data writes into a file that can be transferred to a backup system for processing.

By capturing data writes just above the LVM layer 250, the production intercept layer 240 operates independently from the application layer 210 and the storage device layer 260. Thus, the production intercept layer 240 may be used in any computer system regardless of types of the applications being run or the types of storage devices in the computer system.

As illustrated in FIG. 2, the production intercept layer 240 emulates the devices at the LVM layer 250. Even though the devices are emulated by the production intercept layer 240, the sizes of the devices can be changed. Thus, the production intercept layer 240 does not inhibit the functionality of the LVM layer 250.

According to one embodiment of the present disclosure, the production intercept layer 240 includes storage intercept devices which each mimic a device that sits below it in the LVM layer 250. To the users of the production intercept layer 240, either the file system 230 or the operating system 220, the production intercept layer 240 is transparent. However, unlike other data capture drivers in the LVM layer 240, which do not maintain relational data integrity across independent volumes without control interactions with the application, the data capture driver in the production intercept layer 240 can maintain relational data integrity, which is referred to as global consistency, without any control interactions with the application. The production intercept devices, which overlay potentially independent devices in the LVM layer 250, which can be located, for example, in different Volume Groups, or in entirely different volume managers, are dependent. Accordingly, global consistency can be maintained even in an asynchronous replication environment. Also, the location of production intercept layer 240 enables the collection of data writes across disparate and/or interchangeable storage volumes and storage managers.

While the particular location of the production intercept layer 240 in the illustrated embodiment is between the file system layer 230 and the LVM layer 250, in alternative embodiments of the present disclosure, the production intercept layer 240 can be located at other locations on the primary computer system 200 between application layer 210 and storage device layer 260 as long as it is able to capture data writes in a consistent write order across the extent of the application or production image.

In one embodiment, the production intercept layer 240 can be located between an application layer 210 and the storage device layer 260. In another embodiment, the production intercept layer 240 can be imbedded within the LVM. In another embodiment, the production intercept layer 240 can be embedded within an application layer 210. In this embodiment, an intercept driver of the production intercept layer 240 can be embedded to the point where the user or coder is not aware of the presence of the intercept driver. In another embodiment, the production intercept layer 240 can be located next or at the level of the storage device layer 260 of the primary computer system 200.

In the illustrated embodiment, the primary computer system 200 is coupled to a backup manager 270 that is part of a backup system. The backup system facilitates the replication and storage of data and in some embodiments of the present disclosure, the restoration of the data after a failure as well. The backup manager 270 receives captured data writes from the production intercept layer 240 and processes those data writes. The function and operation of the backup manager 270 are discussed in detail below.

Figure 3:
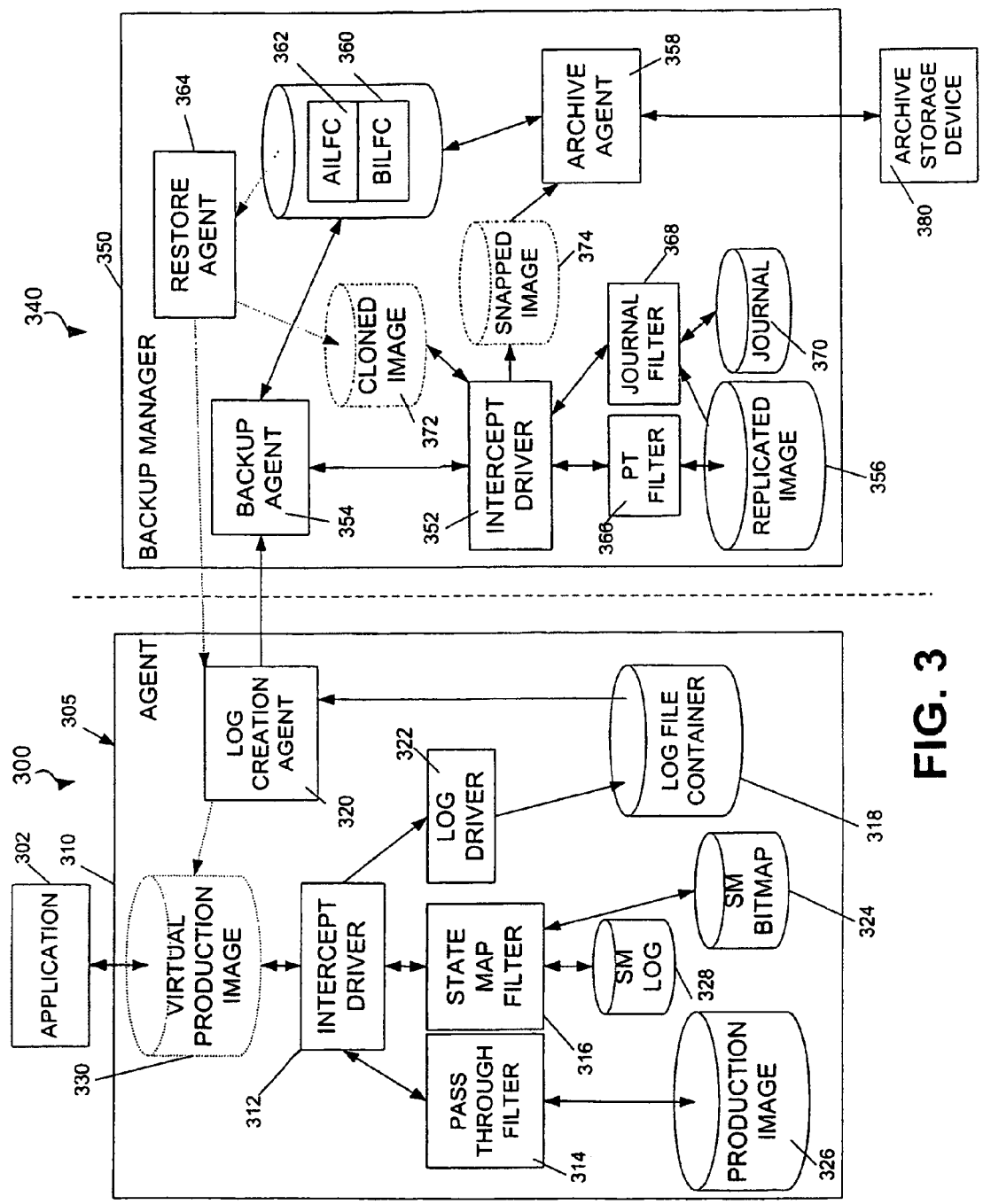
FIG. 3 illustrates an architecture of a backup system according to yet another embodiment of the present disclosure.

An alternative embodiment of some components of a computer system according to the present disclosure is illustrated in FIG. 3. The computer system includes a primary computer system or production host 300 (only a portion of which is illustrated) and a backup computer system 340. The primary computer system 300 includes one or more conventional layers, such as an application 302, and a production intercept layer 305.

The production intercept layer 305 is an extension of a LVM layer of the primary computer system 300. In the illustrated embodiment, the production intercept layer 305 includes an intercept driver 312 that intercepts and redirects data writes in transit from the application 302 to a storage device on the primary computer system 300 as discussed above relative to FIGS. 1 and 2.

The intercept driver 312 operates as a standard storage access device. The intercept driver 312 adopts the designations of the current storage devices on the primary computer system 300 which together make up the extent of the production image 326 and generates altered identifiers for the original storage devices of the production image 326. As a result, the production intercept layer 305 is easy inserted or loaded onto an existing computer system.

The primary computer system 300 includes facilities for the mapping of logical volume names, or other storage device names, to the devices themselves. Typically, a mknod command is used to generate character and block special files in the file system layer which provides this name to device mapping. Applications access a device through the special file "names." To prevent an application, or the primary computer system 300 itself, from remapping a name from the production intercept layer 305 device back to the original storage device it overlays, which would effectively remove the intercept driver 312 and the entire production intercept layer 305 as a result, an altered mknod command is inserted into the operating system layer. When invoked for devices under the production intercept layer 305, the correct mapping to the intercept driver 312 is always preserved. For all other invocations, the altered mknod command operates as the original mknod command that is loaded in the operating system layer.

In conventional computer systems, logical volumes are associated with a set of logical or physical disks. The intercept driver 312 may manage a set of one or more logical or physical volumes. This set is referred to as the "Production Volume Set" (PVS). The block data within the PVS, taken as a whole is referred to as the production image and represents the data state of an entire application on disk. A PVS is different from standard volume groups that are used in logical volume manager tools which organize logical volumes relative to a physical disk. A PVS is a group of logical or physical volumes organized relative to an application. A PVS may contain logical and/or physical volumes spread across one or more volume groups. In one embodiment, the PVS represents the set of volumes that encapsulate a particular databases production image on a primary computer system.

As illustrated in FIG. 3, the production intercept layer 305 includes a pass through filter module 314 and a state map filter module 316. The state map filter module 316 includes a state map log 328 and a state map bitmap 324. The state map bitmap 324 is a bitmap file that tracks the regions of a disk volume that have been changed or to which data has been written. A region is a configurable number of blocks or sectors on disk. Information relating to the block level changes to the production image 326 are recorded or stored in the state map log 328 that is associated with the state map filter 316. The state map log 328 is programmed to periodically write the contents of the state map log 328 to the state map bitmap 324. In some embodiments of the present disclosure, the information in the state map bitmap 324 is cleared when the backup system 340 updates and "commits" the replicated image as discussed below.

The pass through filter 314 of the production intercept layer 305 operates as a conduit for the data writes that are received by the intercept driver 312. The pass through filter 314 forwards the data writes to the storage of the primary computer system 300, the LVM layer 250 devices. In one embodiment, the data writes are passed through to the production image 326.

The production intercept layer 305 also includes a log driver module 322. The log driver module 322 forwards data writes that are received by the intercept driver 312 to a log file container 318. In one embodiment, the log file container 318 is a LVM layer 250 device. The log file container 318 ("LFC") is a file into which captured data writes can be stored or recorded and subsequently transferred to the backup system 340. The agent 310, which includes the production intercept layer 305 and log creation agent 320, can utilize a pool of several LFCs to temporally store application writes prior to transfer to the backup system 340 on a disk of the agent 310. In some embodiments of the present disclosure, each LFC is configurable in size. In some embodiments, multiple LFCs may be buffered during outages, thereby providing a level of increased fault tolerance.

Initially, an LFC does not contain any data writes and therefore is empty. When an LFC includes data, the LFC is referred to as an AILFC. During the backup process, the backup manager 350 generates several BILFCs during its operation. The AILFCs and the BILFCs are described in greater detail below.

The agent 310 also includes a log creation agent 320 which interfaces with the kernel to manage the LFCs. In one example, the AILFC 318 is associated with a portion of a disk on the agent 310 for storing information relating to the data writes on the primary computer system 300. The intercept driver 312 uses the disk to store updates that are made to the local storage volumes of the primary computer system 300. By recording the updates in chronological order, some embodiments of the backup system 340 can historically reconstruct or recover data at any point in time.

The log creation agent 320 monitors the AILFCs during the data writing process. When an AILFC 318 is filled or upon receipt of a seal command, the kernel seals the AILFC 318 and returns the sealed AILFC 318 to the log creation agent 320. The sealed AILFC is forwarded to the backup system 340 as described below. The log creation agent 320 operates as a manager of the captured data writes and maintains its own state map for each AILFC that tracks the data writes that have been captured and stored.

Now an exemplary operation of the agent 310 is briefly discussed. During operation, the intercept driver 312 captures data writes between the application 302 and the storage device. The application 302 is not aware of the capturing of the data writes by the intercept agent. A virtual production image 330 is used to represent the concept that application 302 believes that it is writing data directly to a production image.

When the intercept driver 312 receives a data write, the intercept driver 312 Informs the state map filter 316 to record that a block of the production image 326 corresponding to the data write has been modified. The change is recorded in the state map log 328 and the corresponding disk area in the state map bitmap file 324 is marked as "dirty." The bit that is marked as "dirty" is persistent on the state map bitmap 324 and remains marked until the state map bitmap 324 receives an instruction to clear the bit.

The intercept driver 312 passes the data write to the log driver module 322 and to the pass through filter 314. The log driver module 322 and the pass through filter 314 transmit the data writes to different disks simultaneously.

The log driver module 322 records the data write and some associated meta information to the next available position in the AILFC 318. The log driver module 322 stores and packages subsequently captured data writes in the AILFC 318. The meta information may include: when the data write occurred (for example, by applying a time stamp); to which device the data was written; which block was changed (as determined, for example, by an offset into the production image 326); and how large was the data write (as determined, for example, by the length of the data write). In alternative embodiments, any combination of these types of information and any other information related to data writes can be stored in the AILFC 318. Thus, AILFC 318 contains a chronologically sequenced list of application data writes and associated meta information.

The pass through filter 314 forwards the data write to the real physical or logical volume device of the primary computer system 300. In the event of a logical volume device, the logical volume management device subsequently forwards the data write out to a storage device, such as a disk, in any normal conventional manner. Ideally, the forwarding of the data write by the pass through filter 314 to the logical volume device occurs substantially in parallel with the capture and storage of the data writes.

The log creation agent 320 performs several functions relating to the capture and storage of data writes. The log creation agent 320 monitors the status of the AILFC 318 as the AILFC 318 collects data writes. The log creation agent 320 waits either for the active AILFC 318 to be filled or a seal command. A seal command can be based on a particular amount of data writes, a particular amount of data writing time or performed manually. When the AILFC 318 is full, the kernel seals the AILFC 318, pulls in an empty LFC and makes it active for subsequent data writes, and returns the sealed AILFC 318 to the log creation agent 320.

The log driver module 322 stamps the sealed AILFC with a sequence identifier and/or other information. The log driver module 322 forwards the sealed AILFC to the log creation agent 320 for transmission to the backup system 340.

In the illustrated embodiment, the backup system 340 includes a backup manager 350. In one example, the backup manager 350 includes several program modules or components. In one embodiment, the backup manager 350 can be co-located with storage management server software, such as Legato NetWorker, Veritas NetBackup, and IBM TSM. This storage management server software is used to archive various components of the present disclosure such as LFCs and snapshots of the replicated image.

The backup manager 350 includes a backup agent 354 that receives transferred AILFCs from agent 310. The backup manager 350 includes a backup agent, an archive agent 358, a restore agent 364, and an intercept driver 352 with pass through and journaling filters, the function of each is described in greater detail below. According to some embodiments of the present disclosure, the backup manager 350 maintains a current image of the production image 326 of the primary computer system 300. This current image can be referred to as a replicated image 356. In some embodiments, this image is a globally consistent asynchronous replicated image of the production image with indexed historical journal information. The backup manager 350 maintains this replicated image 356 of the production image 326.

The backup manager 350 includes a pass through filter 366 that applies data writes to the replicated image 356 that is maintained by the backup manager 350. The backup manager 350 also includes a journal filter 368 that receives data writes from the intercept driver 352. The journal filter 368 forwards the data writes to a journal 370 to facilitate readable and writable snapshot images on the back end when a snapshot is active. The journal filter 368 is used for the snapshots only (i.e., copy on write). The journal filter 368 tracks when data writes come in from an AILFC or an application. When a snapshot is active, AILFC writes applied by the backup manager 350 are forwarded to the journal filter 368 by the intercept driver 352, and the journal filter in turn directs the writes to the replicated image with copy-on-write semantics. The data blocks in the replicated image which is overwritten by a particular AILFC write are copied to the journal disk 370 before the write to the replicated image begins. The journal filter 368 relates a readable snapped image 374 of the replicated image 356 by tracking and redirecting I/O to the location of all of the data blocks that existed in the replicated image 356 at the snapshot creation time, which during the life of a snapshot is either in the journal 370 or still in the replicated image (if unchanged). When a writable snapshot is active and an application is mounted over the cloned image 372, application writes are forwarded to the journal filter 368 by the intercept driver 352, and the journal filter 368 in turn directs the writes to the journal 370. The journal filter 368 creates a read/writable cloned image 372 of the replicated image 356 by tracking and redirecting I/O first to the location of any write made by the application mounted on the cloned image 372, and second to the location of all the data blocks that existed in the replicated image 356 at the snapshot creation time.

While in its journal mode, the backup agent 354 continues to write data to the intercept driver 352, which in turn directs it to the replicated image 356. However, before writing to the replicated image, the journal filter 368 copies each to be overwritten block to the read-only portion of the journal 370 to maintain a copy of the original state of the replicated image 356 when the snapshot was taken. While in its writable journal mode, incoming data writes are applied to a read/write portion of the journal 370 that is maintained by the backup agent 354. The intercept driver 352 of the backup manager 350 provides virtual devices for both the snapped image 374 and the cloned image 372 and handles all I/O requests to the virtual devices by redirecting them to the journal filter 368 and pass through 366 filter. In virtualizing a snapped image 374, the intercept driver 352 redirects reads to the read-only portion of the journal 370 or the replicated image 356. In virtualizing a cloned image 372, the intercept driver 352 redirects reads to the read/write portion of the journal 370 or the read-only portion of the journal 370 or the replicated image 356, and redirects writes to the read/write portion of the journal 370.

The backup system 340 also includes an archive storage device 380 that is coupled to the backup manager 350. The archive storage device 380 can be any type of permanent storage device, such as a tape or disk drive. While the archive storage device 380 is illustrated as being external to the backup manager 350, in other embodiments, the archive storage device 380 can be part of the backup manager 350 as would be apparent.

In the illustrated embodiment, AILFCs 318 are transferred to the backup manager 350 asynchronously with respect to the data writes occurring on the primary computer system 300. For example, as an AILFC 318 is filled or once a particular time period elapses, the AILFC 318 is sealed by the kernel of the agent 310. The kernel returns the sealed AILFC 318 to the log creation agent 320. This particular time period can be a fixed time period, such as every twenty seconds, or a variable time period, such as a period based on the quantity of data writes captured. The sealed AILFCs are transferred to the backup agent 354 at any time.

The transfers of AILFCs 318 to the backup agent 354 may be optimized based on various factors. In one embodiment, an optimized or optimal transfer of an AILFC 318 means that the AILFC 318 is transferred to the backup agent 354 on an as needed basis. For example, transfers of the AILFCs 318 to the backup agent 354 can be optimized by periodically or asynchronously transferring AILFCs 318 to the backup agent 354 instead of continuously transferring data writes. Thus, the transfers can be sent when the time is desirable or when the AILFC 318 includes a particular amount of data writes or when a communication link between the log creation agent 320 and the backup agent 354 is available. This eliminates otherwise unnecessary resources that would be required to provide the backup function.

As alluded to above, in some embodiments of the present disclosure, the AILFC 318 is transferred over a communication link between the agent 310 and the backup agent 354. The transfer of the AILFC 318 can be accomplished using various types of communication protocols as would be apparent. For example, in some embodiments of the present disclosure, the transfer can be accomplished using TCP/IP. One or more other protocols may be used simultaneously to transfer information. One or more other links over a given protocol may also be used simultaneously, or as a fault tolerant connection. In other embodiments, if the agent 310 and the backup agent 354 share a storage device, such as a shared disk, then the transfer of the AILFC 318 may utilize the shared storage device.

The processing of information by the backup manager 350 is now discussed. The backup agent 354 of the backup manager 350 receives a transferred AILFC from the log creation agent 320. The transferred AILFC is represented schematically as AILFC 362 in FIG. 3. The backup agent 354 reads the AILFC 362 meta information and identifies the data blocks in the production image 326 that have been changed as a result of each of the data writes in the AILFC 362. Each data block that is changed by a data write in the AILFC 362 can be referred to as an "After Block."

The backup agent 354 identifies and reads the corresponding data blocks from the replicated image 356 on the backup manager 350 prior to the application of an AILFC. Each data block of the replication image 356 that are overwritten based on the contents of the AILFC is identified and referred to as a "Before Block." The backup agent 354 catalogues the data by recording each block of the replicated image 356 that was modified, its location, and the data as it is prior to the overwrite.

The backup agent 354 reads each Before Block from the replicated image 356 in an optimal manner, and stores each Before Block in a BILFC in an optimal manner on the backup manager 350. In one embodiment, no block in the replicated image is read more than once. The location of each block read is in a monotonically increasing sequence. The BILFC is associated with a before or previous image of the production image 326 and is illustrated schematically as BILFC 360 in FIG. 3. Once the BILFC 360 is created for all of the blocks that are changed by the AILFC 362, the BILFC 360 is sealed by the backup agent 354.

The backup agent 354 applies each data write of the AILFC 362 to the replicated image 356. As a result, the portion of the replicated image 356 that has updated information in the AILFC 362 is brought current with the production image 326 on the primary computer system 300. The application of data writes from the AILFC 362 to the replicated image 356 is made in an optimal fashion.

In one embodiment, only the most recent or last occurrence of a data write related to a particular data block is applied to the replicated image 356. In other words, not every data write in an AILFC 362 is applied to the replicated image 356. For example, if a particular data block has three changes included in the AILFC 362, only the last data write is applied to the replicated image 356 to bring that data block current. When the data writes in the AILFC 362 have been applied or recorded to the replicated image 356, the backup agent 354 forwards the AILFC 362 and the BILFC 360 to the archive agent 358. The archive agent 358 forwards the AILFC 362 and the BILFC 360 to the archive storage device 380.

In another embodiment, the backup agent 354 can optimally apply or record, the data writes in the AILFC to the replicated image with sorting, compression and parallel I/O algorithms, maximizing I/O throughput. For example, the data write blocks can be sorted so that they are applied or written to the replicated image in a monotonically increasing disk location sequence, minimizing disk head seek time. If the replicated image is spread across multiple storage volumes, writes to multiple volumes can be made simultaneously. If more than one write in the AILFC is to the same block location, only the most recent or latest write to that location is made to the replicated image 356.

When the data writes have been recorded (applied to the replicated image 356), the backup agent 354 sends a communication to the log creation agent 320 that informs the log creation agent 320 that the data has been replicated. The log creation agent 320 instructs the state map filter 316 to clear the dirty bits in the state map bitmap 324 for the changed blocks that it has tracked. This is the "commit" point of the LFC processing transaction. Once committed, the BILFC and the AILFC pair are sent to the archive agent 358 for subsequent archiving into the storage management server software.

The exemplary process described above can be repeated during the operation of the primary computer system. For example, data writes are continuously captured and stored in AILFCs. The AILFCs are sealed and periodically transferred to the backup manager 350. The backup manager 350 creates a BILFC with the blocks that are changed. The AILFC is applied or recorded to the replicated image 356 and the AILFC and its associated BILFC are archived. The capturing, sealing and transferring actions can be continuously repeated. An exemplary time period over which these activities can occur is illustrated in FIGS. 4 and 5.

Figure 4:
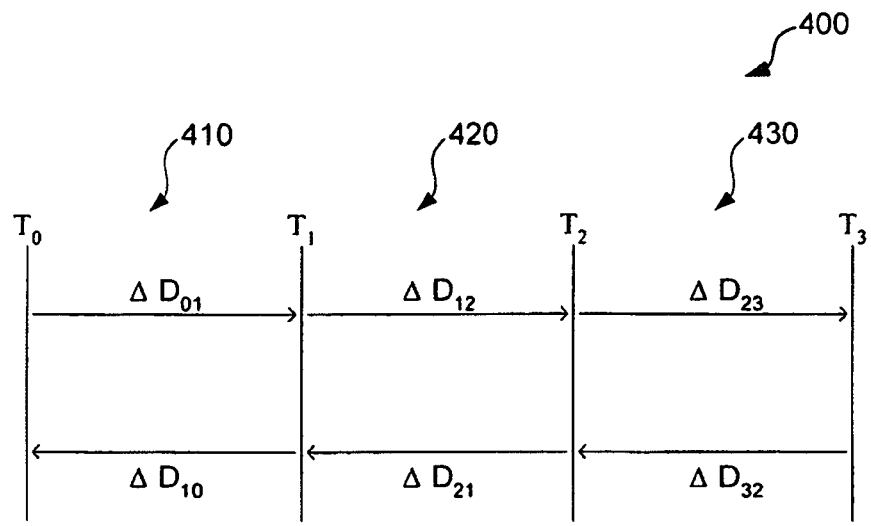
FIG. 4 illustrates a timeline with forward and reverse transactions according to some embodiments of the present disclosure.
Figure 5:
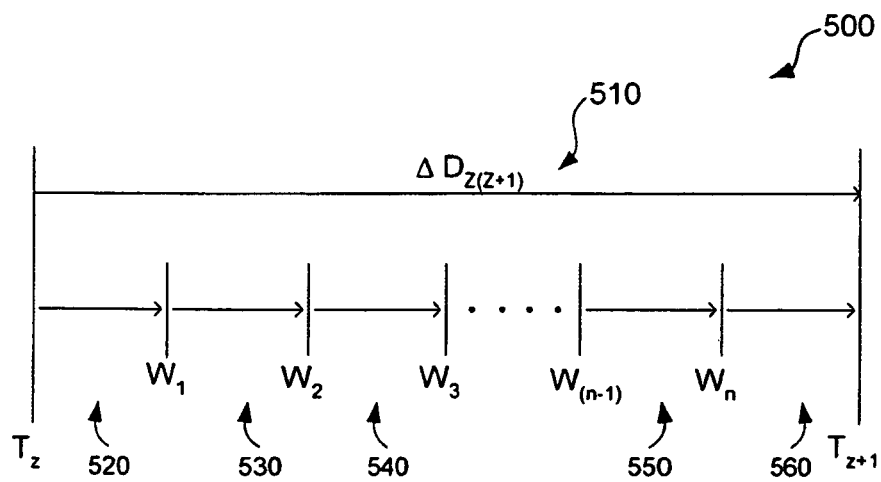
FIG. 5 illustrates a timeline with incremental writes of a forward transaction according to some embodiments of the present disclosure.

An exemplary operation of the backup system is now described relative to FIGS. 4 and 5. Referring to FIG. 4, a timeline 400 representing three different time periods during the operation of the backup system is illustrated. For simplicity reasons only, the operation of the backup system is discussed relative to the following figures with respect to a production image.

Points $T_0$, $T_1$ $T_2$, and $T_3$ represent different arbitrary points in time at which an AILFC 318 is sealed by the log creation agent 320. The log creation agent 320 subsequently transfers sealed AILFCs 318 to the backup agent 354.

Time $T_0$ corresponds to an initial reference time point at which the production image 326 on the primary computer system 300 corresponds to the replicated image 356 on the backup manager 350. Starting at $T_0$, subsequent data writes from an application to a file system on the primary computer system 300 are captured by the intercept driver 312 and packaged in an AILFC 318.

The data writes are captured and packaged between points $T_0$ and $T_1$. At point $T_1$, the kernel of the agent 310 seals the current AILFC 318 and returns the sealed AILFC 318 to the log creation agent 320. The sealed AILFC 318 is subsequently transferred from agent 310 to backup agent 354. Points $T_0$ and $T_1$ are separated by a time period 410. Time period 410 can be a predetermined amount of time (e.g., 1 millisecond, 1 second, 20 seconds, 1 minute, etc.). Alternatively, the length of time period 410 can vary. For example, the sealing of an AILFC 318 can occur when the current AILFC at the agent 310 reaches a certain size, regardless of when the most recent AILFC was sealed.

Point $T_2$ represents the point in time at which the next AILFC is sealed by the kernel. Points $T_1$ and $T_2$ are separated by a time period 420. As discussed above, time period 420 can be either a predetermined or variable amount of time.

Similarly, point $T_3$ represents the point in time at which the next AILFC is sealed by the kernel. Points $T_2$ and $T_3$ are separated by a time period 430. Again, as discussed above, time period 430 can be either a predetermined or variable amount of time.

The sealed AILFCs can be transferred to the backup agent 354 at any point in time. The sealed AILFCs can be transferred individually or can be queued and transferred in a group or can be queued and transferred in parallel.

Referring back to point $T_1$, the kernel seals the current AILFC 318. The AILFC 318 includes information relating to the data writes that were made to the production image 326 between points $T_0$ and $T_1$.

In some embodiments of the present disclosure, when the backup manager 350 receives a transferred AILFC 318 which becomes AILFC 362, it identifies the data blocks in the replicated image 356 that are going to be changed by the data writes in the AILFC 362. The backup agent 354 saves the data blocks of the replicated image 356 that are going to be changed into the associated BILFC. These data blocks correspond to a portion of the production image 326 of the primary computer system 300 at $T_0$.

The backup agent 354 captures the information from the AILFC sealed at $T_1$ and updates the replicated image 356 on the backup manager 350. The backup agent 354 then forwards the associated AILFC and BILFC to the archive agent 358. At this point, the updated replicated image 356 corresponds to the production image 326 on the primary computer system 300 at $T_1$.

Generally speaking, the backup agent 354 can determine a forward increment or difference $\Delta D_{01}$ in the production image from $T_0$ to $T_1$, based on the content of the captured data writes in the AILFC file that was sealed at $T_1$. The forward increment $\Delta D_{01}$ corresponds to the content of the AILFC 362 and represents the changes to the production image 326 between points $T_0$ and $T_1$. Accordingly, $\Delta D_{01}$ represents the changes that must be made to a backup image on the backup manager 350 so that the backup image is the same as the production image 326 at $T_1$.

In some embodiments of the present disclosure, the backup agent 354 can also determine a reverse or backward increment or difference $\Delta D_{10}$ in the production image from $T_1$ to $T_0$. The backward increment $\Delta D_{10}$ corresponds to the content of the BILFC 360 and represents the changes to the production image 326 between points $T_1$ and $T_0$. Accordingly, reverse increment $\Delta D_{10}$ represents the changes that must be made to a backup image on the backup manager 350 so that the backup image (the replicated image 356) is the same as the production image 326 at $T_0$.

The forward increment $\Delta D_{01}$ and the backward increment $\Delta D_{10}$ are collectively referred to herein as a transaction. In one example, the forward increment $\Delta D_{01}$ is associated with the AILFC for the production image 326 at $T_1$. The backward increment $\Delta D_{10}$ is associated with the BILFC at $T_1$, which corresponds to the production image 326 at $T_0$.

In one embodiment of the present disclosure, the forward increment $\Delta D_{01}$ or AILFC 362 and the backward increment $\Delta D_{10}$ or BILFC 360 are archived in the archive storage device 380 by the archive agent 358. In one embodiment, the AILFC 362 and the BILFC 360 are archived automatically. For example, in one embodiment of the present disclosure, the forward increment $\Delta D_{01}$ and backward increment $\Delta D_{10}$ can be stored in archive storage device 380 anytime.

Similar processing occurs at $T_2$ and $T_3$. More particularly, at $T_2$, the forward increment $\Delta D_{12}$ and the backward increment $\Delta D_{21}$ are determined and stored. Likewise at $T_3$, the forward increment $\Delta D_{23}$ and the backward increment $\Delta D_{32}$ are determined and stored.

For example, at point $T_3$ or any time before the next sealing of an AILFC, the backup manager 350 can recreate the image of the production image 326 at $T_1$ based on backward increment $\Delta D_{32}$ and backward increment $\Delta D_{21}$. The backup manager 350 generates a cloned image 372 of the replicated image 356 and applies backward increment $\Delta D_{32}$ and backward increment $\Delta D_{21}$ to the cloned image 372. This process is described in greater detail below. The timeline 500 of FIG. 5 is used to illustrate some of the concepts related to a forward increment and the process of applying individual data writes in an AILFC.

The points $T_z$ and $T_{z+1}$ represent any two consecutive points in time at which AILFCs are sealed. It can be appreciated that if z=0, then $T_z$ and $T_{z+1}$ would correspond to $T_0$ and $T_1$ as illustrated in FIG. 4.

Time period 510 between $T_z$ and $T_{z+1}$ is the period of time between the sealing of two consecutive AILFCs. At point $T_{z+1}$, the forward increment $\Delta D_{z(z+1)}$ can be determined based on the changes in the AILFC that is sealed at point $T_{z+1}$.

The AILFC includes several incremental or individual data writes that have been captured during the data writing process and packaged in the AILFC 318. In the illustrated embodiment, while the individual data writes in an AILFC collectively make up a single backup manager processing transaction, the individual data writes are preserved.

As illustrated in FIG. 5, points $W_1$ through $W_n$ represent individual data writes captured by the intercept driver 312 and recorded in an AILFC 318. In the illustrated embodiment, $W_n$ is used to indicate that there is not a fixed number of data writes between consecutive sealings of AILFCs. In other words, n may be any number. In other embodiments of the present disclosure, consecutive AILFCs may be sealed based on a particular number of data writes or W points.

Point $W_1$ corresponds to the first data write captured and packaged after point $T_z$. Points $W_2$ and $W_3$ correspond to subsequent data writes that are captured and packaged. Point $W_{(n-1)}$ corresponds to the second to last data write before the sealing of the AILFC at point $T_{z+1}$. Point $W_n$ corresponds to the last data write before the sealing of the AILFC at point $T_{z+1}$.

Points $W_0$ and $W_1$ are separated by time period 520 that can be either a predetermined amount of time or a variable amount of time. Similarly, points $W_1$ and $W_2$ are separated by time period 530 and points $W_2$ and $W_3$ are separated by time period 540. Likewise, time periods 550 and 560 separate $W_{n-1}$, $W_n$ and the sealing of the AILFC at $T_{z+1}$.

The data writes and their related meta information stored in each AILFC are historical and/or chronological information that relate to the changes in the production image 326. The forward increments and backward increments $\Delta D$ can be determined as discussed above. The increments and the historical information enable the backup manager 350 to restore the production image 326 to represent the data in the production image 326 at any point in time.

For example, once forward and backward increments are determined, the backup manager 350 can recreate the image of the production image 326 at any particular point in time. The recreation process occurs in two portions. First, backward increments are used to recreate the production image at one of the sealing times, $T_0$, $T_1$, $T_2$, etc. Next, the incremental data writes in a corresponding AILFC are used to recreate the production image at one of the individual data writes at a point $W_1$, $W_2$, etc.

In the illustrated embodiment, the user or system administrator identifies an estimated time location to which the production image 326 should be restored, as described in detail below. Once the estimated location is received, the backup manager 350 rolls the backup image backward to a particular transaction and then forward through the individual data writes to the estimated location. The roll forward can be made in an optimal manner with sorting, compression and parallel I/O.

At this point, the system administrator checks the backup image at $W_1$, typically by executing the application over the restored image. If the backup image at that time is correct or does not contain any errors, then the system administrator can elect to advance the backup image forward in time. If the application is up on the restored image, it must be brought down before continuing. For example, the backup manager 350 can update the backup image to correspond to the production image 326 at point $W_2$. The system administrator reviews the backup image at that time and determines whether the backup image contains any errors. The process can continue until an incorrect image is identified.

FIGS. 4-5 illustrate the use of the AILFCs, BILFCs, and data writes and the techniques of moving forward and/or backward to achieve a particular image of data on the primary computer system 300. The recreated backup image can be used for diagnostic purposes as well as restoration of other images. As discussed above, an image can be rolled back to any particular point in time. In particular, each incremental data write can be rolled out granularly to review or recreate an image at a particular time.

As discussed above with reference to FIG. 4, the forward increments $\Delta D_{01}$, $\Delta D_{12}$, and $\Delta D_{23}$ can be applied to an image to update the image to a particular point in time, such as $T_1$, $T_2$, or $T_3$, respectively. Similarly, the backward increments $\Delta D_{32}$, $\Delta D_{21}$, and $\Delta D_{10}$ can be applied to an image to roll back the image to a particular point in time, such as $T_2$, $T_1$, or $T_0$, respectively.

As discussed above with reference to FIG. 5, at a particular time, such as $T_2$, the backup agent 354 can advance through the individual data writes in an AILFC. For example, the backup agent 354 can apply the data write for $W_1$ to an image to update the image to the point in time corresponding to $W_1$. The backup agent 354 can also apply the subsequent data writes at $W_2$, $W_3$, etc. The application of the data writes allows the backup agent 354 to generate an image that can be used to determine the exact location from which to bring back the file, database, or application on the primary computer system 300.

In an alternative embodiment of the present disclosure, the backup system 350 can incrementally roll through data writes in reverse chronological order. In other words, instead of applying a BILFC to an image to jump back from $T_2$ to $T_1$, individual data writes captured between those points in time can be applied to the image in reverse order starting with the data write at $W_n$.

Figure 6:
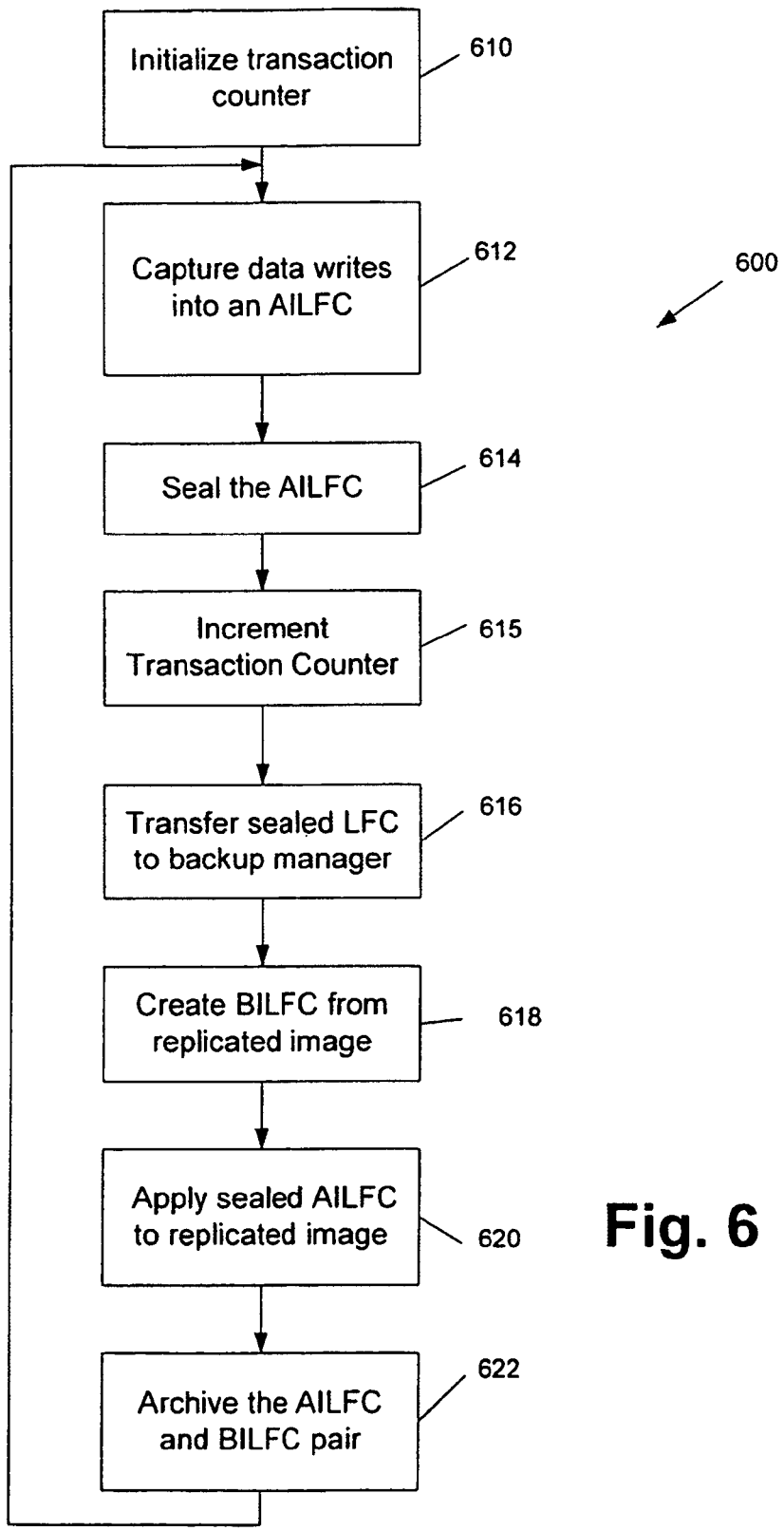
FIG. 6 is a flow diagram for processing before images and after images according to some embodiments of the present disclosure.

An exemplary operation of the backup system is now described with reference to FIG. 6. FIG. 6 illustrates a flowchart 600 of an exemplary process of capturing data writes and updating a backup image on the backup system 340. While flowchart 600 illustrates some of the operations that are performed in this process, other combinations of operations may be carried out.

At operation 610, the backup manager 350 initializes a transaction counter at the beginning of the writing of data by an application. In the illustrated embodiment, the transaction counter is used to determine the earliest point in time to which the production image 326 needs to be restored. For example, the transaction counter can be set to $T_0$.

At operation 612, the agent 310 captures the data writes and packages them into an AILFC 318. In the illustrated embodiment, the data writes are packaged chronologically into the AILFC 318.

In the illustrated embodiment, the intercept driver 312 receives the data write and informs the state map filter 316 that a data block in the production image 356 associated with that data write has been changed. The data write is forwarded to the pass through filter 314, which forwards the data write to the logical volume. The data write is also forwarded to the log driver 322 which time stamps the data write and transfers the data write and its related information to the AILFC 318.

At operation 614, the log creation agent 320 extracts the AILFC 318. The kernel of agent 310 seals the AILFC 318 and returns the sealed AILFC 318 to the log creation agent 320. As discussed above, the AILFC 318 can be sealed after any amount of time. In this example, the AILFC 318 is sealed at $T_1$ (see FIGS. 4 and 5). A new empty LFC is then loaded for subsequent data writes.

At operation 615, the transaction counter is incremented by the backup manager 350 and the process returns to operation 612. In this example, the transaction counter is incremented to 1, and would thus correspond to point $T_1$. The data capturing continues from $T_1$ until the next AILFC is sealed, which is $T_2$.

At operation 616, the sealed AILFC 318 is transferred from the agent 310 to the backup manager 350. The transfer can occur at either a fixed time or a variable time after the AILFC 318 is sealed. The transferred AILFC 318 represents an AILFC at a particular point in time.

At operation 618, the backup agent 354 creates a BILFC from the replicated image 356 that is maintained by the backup manager 350. In one example, each data block in the replicated image 356 that corresponds to a data write in the transferred AILFC is identified and copied into a BILFC.

At operation 620, the data writes in the transferred AILFC are applied to the replicated image 356 of the backup manager 350. In this example, the backup manager 350 applies the contents of the transferred AILFC 362 to the replicated image 356. After the replicated image 356 is updated with the data writes in the AILFC 362, the replicated image 356 corresponds to the production image 326 on the primary computer system at $T_1$.

Once the data writes in the transferred AILFC 362 have been applied to the replicated image 356, the backup agent 352 informs the log creation agent 320 that the replicated image 356 has been updated. The log creation agent 320 informs the state map filter 316 to clear dirty bits in the state map bitmap 324 for the particular block or groups of blocks associated with the AILFC.

The process of applying AILFCs repeats itself until there are no further data writes and all data writes have been applied to the backup manager 350. At that time, the backup or replicated image on the backup manager 350 represents the production image on the primary computer system 300.

At operation 622, after all of the data writes in the transferred AILFC have been applied, the corresponding AILFC and BILFC pair is forwarded by the archive agent 354 to the archive storage device 380. The AILFC and the BILFC are related forward and backward increments and collectively form a transaction. The backup manager 350 can then subsequently retrieve and use the AILFC and BILFC pair during any subsequent process.

Each AILFC and BILFC pair spans a backup/restoration window of time. In one example, the application of an AILFC to an image moves the image forward in time and the application of a BILFC to an image moves the image backward in time.

Figure 7:
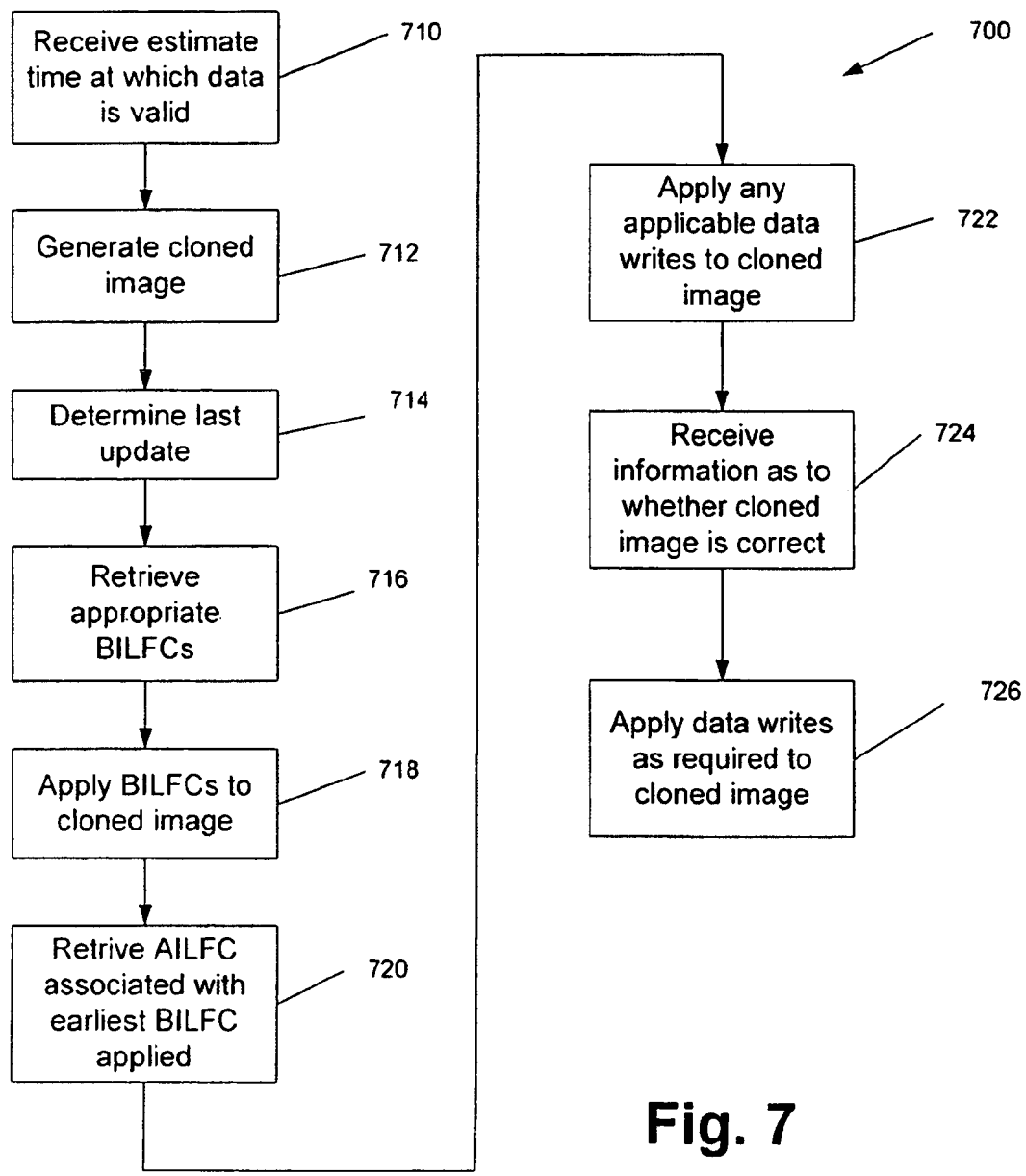
FIG. 7 is a flow diagram for recovering data according to some embodiments of the present disclosure.

An exemplary process for the generation of an image that is a clone of the production image at a particular point in time is described with respect to FIG. 7. FIG. 7 illustrates a flowchart 700 that includes some of the operations that are performed in this process. Other combinations of operations may be carried out in variations of this process.

The process illustrated in FIG. 7 assumes that there has been a system failure or data corruption in the primary computer system. In this process, the backup manager 350 wants to generate an image that is a clone of the production image 326 at a particular point in time. The backup manager 350 "snaps" the replicated image 356 in its current state and modifies it to a particular point in time by applying certain AILFCs and BILFCs as set forth below.

At operation 710, the backup manager 350 receives an input of an estimated time from the user as to when the data on the primary computer system was or should be correct. After a failure or corruption has occurred, the user or systems administrator initiates a recovery through the system interface. The backup manager 350 prompts the user or system administrator for information related to the timing of the failure. In some embodiments, the backup manager 350 includes a user interface that facilitates the input of such information. The user interface can be a graphical user interface or a command line interface. In this example, it is assumed that the estimated time location corresponds to $W_1$ which is located between $T_1$ and $T_2$.

At operation 712, the backup manager 350 generates a cloned image 372 using the replicated image 356 on the backup manager 350. In this example, the restore agent 364 places the backup agent 354 into a journal mode. The backup agent 354 temporarily suspends updates and takes a snapshot of the replicated image 356. The backup agent 354 can create a writable snapshot of the replicated image 356, which can be referred to as a cloned image 372.

At operation 714, the backup manager 350 determines the last update to the backup image on the backup system. In one embodiment, the backup manager 350 determines which AILFC was most recently applied to the backup image. In this example, the backup manager 350 determines that the last update was at $T_3$.

At operation 716, the backup agent 354 determines the time period from the last update to the estimated time or just before the estimated time. The backup agent 354 retrieves the relevant BILFCs that correspond to that period of time.

In this example, if the last update time was $T_3$ and the estimated time from the user was $W_1$, which is located between $T_1$ and $T_2$, then the backup agent 354 retrieves the backward increments $\Delta D_{32}$ and $\Delta D_{21}$. If these BILFCs are not on the disk of the backup manager 350, the restore agent 364 requests them from the archive agent 358 from archive storage device 380.

At operation 718, the restore agent 364 applies or records the backward increments to the cloned image 372. In this example, the restore agent 364 applies the backward increments $\Delta D_{32}$ and $\Delta D_{21}$ to the cloned image 372 so that the cloned image 372 represents the production image at $T_1$.

At operation 720, the restore agent 364 obtains the AILFC that corresponds to the earliest BILFC that was applied to the cloned image 372 in operation 714. In this example, the restore agent 364 obtains the AILFC for $T_1$.

At operation 722, the restore agent 364 determines whether the cloned image 372 has been updated to the estimated time. If the cloned image 372 is not at the estimated time yet, the restore agent 364 reviews the AILFC obtained in operation 720 and applies the data writes in the AILFC in order to the cloned image 372 until the estimated time is reached. Once the cloned image 372 is at the estimated time, the cloned image 372 is the same as the production image 326 at that point in time, which in this example, is sometime between at $T_1$ and $T_2$. The process of applying backward and forward increments to the cloned image 372 can be referred to as rolling back the cloned image 372.

At operation 724, the restore agent 364 receives confirmation from the user as to whether the cloned image 372 is correct. In one embodiment, the backup manager 350 can provide the user with the choice between: (a) updating the particular file, database, or application on the primary computer system 300 to the point at which the cloned image 372 has been updated; (b) further updating the cloned image 372 to a different point in time; or (c) executing the same restoration directly to the production image.

In this example, the user reviews the cloned image 372 that corresponds to point $W_1$ and determines whether to update the primary computer system 300 or further refine the cloned image 372. If the user decides to update the primary computer system using the cloned image 372 at $W_1$, then the restore agent 364 performs the desired restoration action. If the user decides to further refine the cloned image 372, then the process continues to operation 726.

At operation 726, the restore agent applies data writes to the cloned image 372 as required. In this example, if the user determines to further refine the cloned image 372, the restore agent 364 retrieves the next data write, which is at $W_2$, and applies that data write to the cloned image 372. At this point, the update cloned image 372 corresponds to the production image 326 at point $W_2$.

The system administrator reviews the cloned image 372 at point $W_2$ and determines whether that cloned image 372 has any errors. In this example, the cloned image 372 at point $W_2$ does not include any errors. Thus, the system administrator decides to advance the cloned image 372 to the next data write.

The backup manager 350 retrieves the next data write, which is at $W_3$ and applies that data write to the cloned image 372. The updated cloned image 372 corresponds to the production image 326 at point $W_3$. In this example, the cloned image 372 at point $W_3$ contains an error. Thus, the previous cloned image 372 that did not have an error is the desired restoration point. The point in time corresponding to that image can be referred to as the "target time." The system administrator decides to utilize the cloned image 372 at point $W_2$ to update the database on the primary computer system 300. Alternatively, the system administrator performs a restoration to the target time directly to the production image.

An error can occur in a data write several ways. Some exemplary errors that could be present in a data write include: a data corruption, an invalid transaction, an infiltration into the primary computer system, a failure of the primary computer system, a virus, etc.

The cloned image 372 can be used in a variety of ways. In one example, the cloned image 372 can be used to restore the production image on the primary computer system 300. The combination of the BILFC and several incremental data writes results in the cloned image being updated to a smaller time increment than a transfer of an AILFC.

FIGS. 6 and 7 illustrate various techniques of moving forward or backward to achieve a particular image of data on the primary computer system 300. The incremental historical or chronological information enables the backup manager 350 to roll backward to a particular location from which a file, database, and/or application on the primary computer system 300 can be restored. The ability to incrementally advance through the data writes eliminates the need to restore the full volumes by allowing incremental changes to be applied to the cloned image in the case of a "virtual restore," or the production image in the case of a "production restore."

Now the restoration or recovery of data in accordance with the present disclosure is described. There are several types and techniques of data restoration contemplated by the present disclosure. In some embodiments of the present disclosure, the particular technique for the recovery process can be selected by the user via any type of user interface, such as a graphical user interface or a command line interface.

During a restoration operation, the data writes and their related information from the agent 310 are maintained in a three level hierarchy in the illustrated embodiment. At the first level, a replicated image 356 of the production image 326 is maintained by the backup manager 350. The second level is the read-only journal 370 which stores blocks that are modified by the backup agent 354 based on data writes in an AILFC. The third level is the write journal which captures data writes coming in from an application accessing the virtual device. The intercept driver 352 reads the information in the write journal when an application that is accessing the cloned image 372 initiates a read request.

One type of data restoration is full recovery of data to any point in time. Another type of data restoration is partial recovery of data, such as the repair of a table or particular records. Another type of data restoration is disaster recovery with the ability to provide a copy of an application that can be used in place of a corrupted application.

In one example, full recovery of data is accomplished by rolling back the production image 326 to an appropriate restoration point with BILFC and AILFCs. The restore agent 364, backup agent 354, archive agent 358 and log creation agent 320 work together during the execution of a "production restore." Once the appropriate restoration point is met, the administrator can bring the particular database or application on the primary computer system 300 back up and resume normal operations.

In one example, in a partial recovery of data process, the appropriate restoration point in the data is identified in the same manner as in the full recovery technique. Once the restoration point is identified, a full recovery of data is accomplished by rolling back the cloned image 372 to an appropriate restoration point with BILFC and AILFCs. Then, a second instance of the application running over the production image 326 is brought up over the restored cloned image 372. With the clone application, the system administrator can identify particular tables and/or records for partial restoration to the production image 326. These tables and/or records are extracted from the cloned application and then inserted into the active production application, which in turn performs I/O representing the inserted objects, updating the production image with the partial restore. The extraction and insertion or the tables and/or records can be accomplished using any conventional data copying and pasting or inserting techniques from within an application that "understands" the image (i.e., the application and/or file systems over the production image).

In one example, a cloned image 372 can be created by taking a snapshot of the replicated image 356, and then restored. An administrator can test the validity of the restored cloned image 372 while the production image 326 and replication image 356 are still in operation.

When a cloned image 372 is rolled back block by block to an earlier desired point in time, a piece of the cloned image 372 can be pulled out and inserted into a database that is currently running. For example, a database with five files has two files that go bad. The user does not want to roll back all five files in the database. A cloned image 372 of the production image 326 can be created and all five files rolled back to a particular point in time. The application on the primary computer system 300 pulls the applicable two files out of the cloned image 372 and inserts them into the production image 326 by recording the changes to the database. The changes are captured by the intercept driver 312 into an AILFC which is forwarded to the backup manager 350. The changes are eventually recorded to the replicated image 356 during the normal backup process described above.

During the identification, extraction, and insertion procedures, the production image on the primary computer system 300 remains operational for any applications that do not need the corrupted tables and/or records of the production image. As a result, the recovery process enables users to continue use of the non-affected portion of the production image.

In the disaster recovery technique, a selected database application is launched directly on the backup manager 350 in one example. The launched database application is pointed to the cloned image 372 on the backup system 340. In another embodiment, the launch database application is pointed directly to the replicated image 356. In one embodiment, the replicated image can be rolled back to a clean state.

In one embodiment, the backup manager 350 can create a read/write copy of the replicated image 356. The read/write copy can be referred to as a cloned image 372. Once a cloned image 372 is created, the database can keep running while data analysis such as data mining, financial analysis, testing, restoration verification or disaster recovery is performed on the cloned image 372. The cloned image 372 eliminates the need to quiesce a database in order to perform data analysis on the data.

The backup manager 350 can create a read-only copy of the replicated image 356, and use it to perform an automatic "off-production-host" full backup of the replicated image 356 to an archive storage device 380. This is also called a "virtual full backup." Snapped images 374 can be saved to an archive storage device 380. If the replicated image 356 goes bad, a snapped image 374 can be used to generate a copy of the replicated image 356 at a particular point in time.

A virtual full backup of an application, database, and/or file can be created from the snapped image 374. The virtual full backup can be used to restore a baseline to which changes could be applied in order to restore a full image to a desired point in time with minimal incremental data movement in the least amount of time possible. The backup system can be used to restore a historical virtual full backup and roll the image forward to the desired point between consecutive virtual full backups.

In an alternative embodiment, the backup manager 350 can be used to restore a physical block of the primary system if there is a corruption of the block. If an entire logical volume fails, the relevant blocks of the primary system can be restored somewhere else. For example, a user may want to restore one or more blocks to a particular point in time. The user can utilize forward and backward increments to restore the particular blocks to the same point in time as the other blocks of the primary system that were not corrupted.

In an alternative embodiment, backup manager 350 can develop a block map that tracks with a particular AILFC. The block map can contain information relating to which blocks in a production image were modified. During restoration, the backup manager could recover from a fatal corruption or disaster by knowing which AILFC included a data write that last modified a particular block.

In an alternative embodiment, the backup system 340 may include an appliance. In this embodiment, there is no intercept driver inserted as a layer in the hierarchy of the primary computer system 300. Rather, it is inserted as a layer in the hierarchy of the backup system 340. The appliance presents LUNs to the production system, and application 110 still flows through the production intercept layer. However, the production intercept layer is now on the backup system 340. The remaining processing is the same as the other embodiments.

In one embodiment, the primary computer system and the backup system can be located on the same server or system. In an alternative embodiment, the primary computer system and the backup system can be configured so as to provide backup services to each other.

In an alternative embodiment, the log creation agent 320 and the backup manager 350 can perform a "super transaction" which is the creation and application of multiple AIL-FCs as a single transaction. In this embodiment, statemap information is used to drive the super transaction. The statemap tracks blocks which have not yet been replicated to the backup manager 350. For example, the intercept driver 312 sends data writes to the AILFC 318, the state map bitmap 324 is updated to identify that a block in the production image 326 has been changed. The disk block is referred to as being dirtied and is maintained persistent on the disk. In the event of system problems, such as extended network outages, the log driver 322 may run out of log file space. In this scenario, the system drops into a degraded mode of operation where only state map information in the state map bitmap 324 is updated and maintained. When the system problems have been resolved, the log creation agent 320 automatically enters a recovery mode which uses the state map bitmap 324 to selectively forward "dirty" blocks to the backup system 340. The log creation agent 320 continues the recovery process until all blocks have been forwarded. The system then returns to normal operation. This recovery process can be referred to as a "super transaction" in which all of the AILFCs transferred during the recovery process are treated as a single transaction.

The backup manager 350 processes the AILFCs in this super transaction in the same way that the backup manager 350 treats AILFCs received during normal operation. For example, BILFCs are created, AILFCs are applied to the cloned image 372, pairs of AILFC and BILFCs are archived, etc. However, there is no chronological ordering of data in the AILFCs of a super transaction. Thus, the restoration can not be made to a point inside of a super transaction AILFC. However, restorations can move across a super transaction. For example, restorations can move backwards by applying all the BILFCs of the super transaction, and forwards by applying all of the AILFCs of the super transaction.

While the present disclosure has been described in detail and with reference to specific embodiments thereof, it will be apparent to one skilled in the art that various changes and modifications may be made therein without departing from the spirit and scope thereof. Thus, it is intended that the present disclosure covers these changes and modifications provided they come within the scope of the appended claims and their equivalents.

The invention claimed is:

1. A computer system comprising:
a logical volume management device configured to capture all data writes associated with metadata from an application and duplicate all of said data writes onto a logical volume, wherein the metadata includes a size associated with the data writes;
a production volume set, wherein said production volume set is associated with a data state of at least one of a logical volume and a physical volume configured for said application, wherein said logical volume management device comprises at least one sequential logging storage device and a production intercept layer that intercepts and simultaneously redirects all of said data writes in transit from said application to said production volume set onto said logical volume so that all of said data writes are duplicated; and
a backup manager configured to selectively advance forward in time through a plurality of logical volumes upon determining that at least one logical volume of the plurality of logical volumes is without errors, such that the production volume set corresponds with the plurality of logical volumes, wherein the backup manager is further configured to selectively advance through a plurality of captured data writes to replicate a former state of the physical volume.

2. The computer system of claim 1, wherein said at least one of a logical volume and a physical volume are spread across a plurality of volume groups.

3. The computer system of claim 1, wherein said production volume set encapsulates a production image of a particular database on the computer system.

4. The computer system of claim 1, wherein said production volume set represents the data state of said application.

5. The computer system of claim 1, wherein said logical volume management device forwards the data writes to the backup manager.

6. The computer system of claim 5, wherein the backup manager includes an archive storage device for receiving data writes.

7. The computer system of claim 5, wherein the backup manager is configured to generate a replicated image of the production volume.

8. A method comprising:
associating a production volume set with an application on a computing system;
capturing all data writes from the application, wherein the captured data is associated with at least one of a logical volume and a physical volume;
duplicating all of the data writes on a predetermined logical volume, wherein a plurality of logical volumes is selectively advanced upon determining that at least one logical volume of the plurality of logical volumes is without errors, wherein selectively advancing the plurality of logical volumes further comprises selectively advancing through a plurality of captured data writes to replicate a former state of the physical volume;
simultaneously forwarding the data writes from the application to the production volume set;
forwarding the data writes to at least one sequential logging storage device; and
associating metadata with the data writes, wherein the metadata includes a size associated with the data writes.

9. The method of claim 8, further comprising:
forwarding the metadata to the backup system.

10. The method of claim 9, wherein the metadata includes a location of the data writes on the production volume.

11. The method of claim 9, wherein the metadata includes a time stamp associated with the data writes.

12. The method of claim 9, further comprising replicating the production volume in the backup system using one or more data writes and associated metadata.

13. The method of claim 8, further comprising forwarding the data writes to a log file container.

14. The method of claim 8, wherein the at least one of a logical volume and a physical volume is associated with an image of the application on a primary computer system.

15. The computer system of claim 1, wherein the production volume set represents an image of the application on a primary computer system.

16. The computer system of claim 1, wherein the at least one logging storage device stores said data writes in the sequence issued by the application.

17. The computer system of claim 16, wherein said data writes comprises the data, metadata, location, and file size.

18. The method of claim 8, further comprising storing the data writes in the at least one logging storage device in sequence issued by the application.

\* \* \* \* \*